F. G. & E. A. FLOYD.

Broadcast Seeder.

No. 3,075. Reissued Aug. 11, 1868.

Witnesses
E. R. Beadle
Frederic Thomas.

Inventor
F. G. Floyd
E. A. Floyd by
J. M. Beadle atty

N. PETERS. Photo-Lithographer, Washington, D. C.

UNITED STATES PATENT OFFICE.

F. G. FLOYD AND E. A. FLOYD, OF MACOMB, ILLINOIS.

IMPROVEMENT IN BROADCAST-SOWERS.

Specification forming part of Letters Patent No. 63,378, dated April ·, 1867; Reissue No. 3,075, dated August 11, 1868.

*To all whom it may concern:*

Be it known that we, F. G. FLOYD, of Macomb, in the county of McDonough and State of Illinois, and E. A, FLOYD, of Macomb, in the county of McDonough and State of Illinois, have invented new and useful Improvements in Broadcast Seed-Sowers; and we do hereby declare that the following is a full and exact description of the same, reference being had to the accompanying drawings, and to the letters of reference marked thereon.

This invention relates to an improved construction of hand seed-sowers, the novelty of which consists in a new form of disk, in a peculiar manner of attaching the disk to the shaft, in a compact arrangement of the disk and frame, in a simple arrangement of the slide, and in a novel arrangement of gearing, a full description of all which will be given hereinafter.

Figure 1:
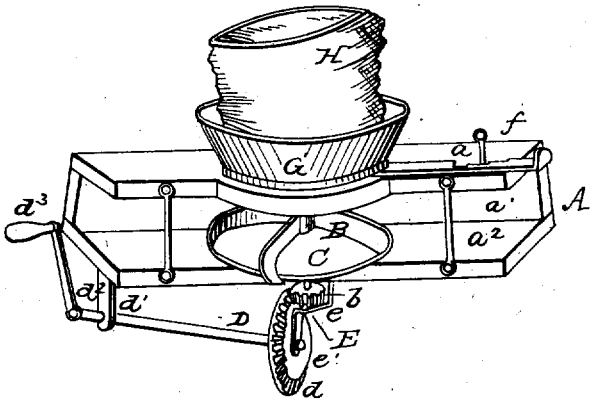
Figure 2:
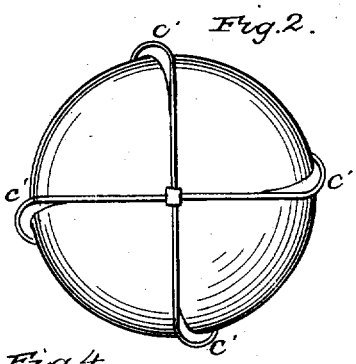
Figure 3:
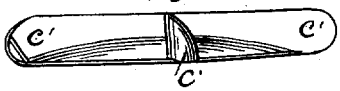
Figure 4:
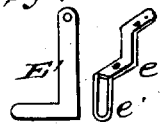
Figure 5:
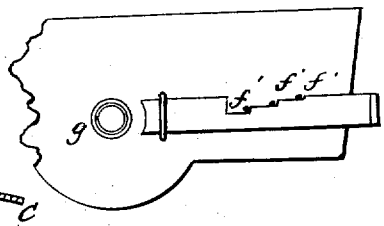

Figure 1 represents a perspective view of our invention; Figs. 2 and 3, views of the disk; Fig. 4, views of the standard E; Fig. 5, a plan view of the slide and feeding-hole, and Fig. 6 a view of the manner of attaching the disk to the shaft.

In the drawings, A represents the frame of the machine, which is constructed of the top piece, $a$, back piece, $a'$, and bottom piece, $a^2$, the former of which, $a$, has a semicircular extension, as shown, by which means the hopper is placed directly over the disk.

B represents the main shaft, upon which is secured the disk C, as will be hereinafter described. The shaft B is provided at its lower end with the bevel-gear wheel $b$, which engages with the corresponding gear-wheel, $d$, of shaft D.

E represents a peculiarly-shaped standard, suitably attached to the lower piece, $a'$, of the frame, which consists of an L-shaped piece of metal, which is so bent and arranged that one part of it, $e$, forms the bearing for the lower end of the shaft B, and the other part, $e'$, forms the bearing for the inner end of the shaft D.

It will be observed that the gear-wheel $d$ is much larger in size than the gear-wheel $b$, with which it engages, by which arrangement the rapid motion necessary is obtained and communicated to the disk without obliging the operator to turn the crank with great speed.

The shaft D passes obliquely under the frame A, and is supported near its outer end in the bearing $d'$, beyond which point it crooks and forms the crank $d^2$, with handle $d^3$. By this arrangement the handle is placed at a convenient point to be easily turned by the right hand of the operator.

Figure 6:
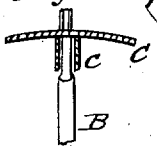

C represents the disk, which is attached to the shaft B by means of the projection $c$, the shaft having been cut away at the proper point in such manner as to form a square depression, in which the projection rests, as clearly shown in Fig. 6. This disk C is circular in form and inclines downward in every direction from the center to the circumference. It is provided at suitable and regular intervals with the flanges $c'$, which radiate from the center, and, extending beyond the circumference, are curved and formed in such manner as to make a slight cup or pocket, as shown in Fig. 2.

F represents a slide, constructed of any suitable thin metal, the inner end of which is curved to correspond with the feeding-hole in the hopper. This slide is confined by guides, which prevent lateral movement, but allow proper adjustment in the line of the feeding-hole. The slide is cut away, as shown, and is operated in connection with the holes $f'$ and pin $f$. By this arrangement the supply of seed may be entirely cut off or regulated for a greater or less flow, as may be desired.

G represents a hopper, located in line over the disk C, which is provided with the feeding-hole $g$.

H represents the hopper-bag in which the seed is placed. The machine is attached by suitable straps to the person operating it in such manner as to be easily worked, the hopper-bag being long enough to reach over the shoulder and large enough to contain as much seed as can be conveniently carried.

By the general construction and arrangement herein described a simple, compact, and efficient machine is produced.

In this arrangement the rotating disk is located almost entirely within the frame A, which latter entirely closes the rear side by means of the back piece, $a'$. This construction is intended for the purpose of confining the machine entirely to a front and side delivery, for if the rear side of the machine be left open the seed is liable to be thrown at times backward, in which case the ground about the operator is covered a second time, and the sowing thus rendered uneven. In our machine, however, no such result can take place. If by chance the seed be delivered rearwardly, it strikes against the back piece, $a'$, and either glances to one side or is caught by the bottom piece, $a^2$.

We are aware that some machines have been arranged somewhat similarly to ours in this respect—as, for instance, the machine of John R. Rodgers, patented January 19, 1864, has a curved shield placed behind the revolving wheel, evidently for the purpose of causing the seed, when thrown backward, to glance to either side; but as the shield is placed only in the rear of the wheel and does not extend beneath it, it necessarily follows that more or less seed must fall perpendicularly to the earth upon ground already covered, and thus be wasted.

Another novel feature of our machine is the arrangement of the gearing for operating it. By means of the peculiar form of the standard E, before described, the contiguous ends of the shafts of the gear-wheels *b d* have their bearings near together in the same standard, which arrangement is much more simple and compact than where two standards are used. The use of gearing in this case, also, is much preferable to cords and pulleys, for the latter are liable to slip at times, and require more or less adjustment of the cords.

From the foregoing description the operation of our machine will be readily understood. The bag having been filled with seed, the machine is adjusted by the straps in such manner that it may be comfortably carried by the operator. Having arrived at the field, the slide is adjusted so that the desired quantity of seed is allowed to flow through the feeding-hole, the former being kept in place by means of the pin $f$, which is placed in one of the holes $f'$. The sower then steps off, turning the crank $d^2$ by the handle $d^3$. The proper motion is thus communicated to the disk, and the seed is scattered uniformly over the ground.

This machine may be attached to a wagon or vehicle, and be operated in a similar manner, or it may be carried on horseback, if desired.

Having thus fully described our invention, what we claim as new, and desire to secure by Letters Patent, is—

1. The frame A, constructed as described, shaft B, disk C, when arranged in relation to each other as and for the purpose set forth.

2. The disk C, with projection $c$, in combination with shaft B, the former being attached to the latter in the manner described.

3. The shaft B, with gear-wheel $b$, shaft D, with gear-wheel $d$, and standard E, the whole being combined and operated as set forth.

4. The slide F, constructed as described, in combination with pin $f$ and holes $f'$, as and for the purpose set forth.

5. The revolving disk C, provided with the radial flanges $c'$, having their outer ends projecting beyond the periphery of the disk and curved in the manner shown, substantially as set forth.

6. The combination of the frame A, hopper G, slide E, and revolving disk C, constructed as above set forth, all arranged for joint operation as herein described.

7. The frame A, shaft B, with wheel $b$, shaft D, with wheel $d$, disk C, slide F, hopper G, and bag H, the whole being combined and operated in the manner set forth.

This specification signed and witnessed this 4th day of April, 1868.

F. G. FLOYD.
E. A. FLOYD.

Witnesses:
C. A. STULTS,
JOSEPH SANACHALL.